(12) United States Patent
Kim

(10) Patent No.: US 10,737,571 B2
(45) Date of Patent: Aug. 11, 2020

(54) FUEL FILL OPENING STRUCTURE

(71) Applicant: YACHIYO INDUSTRY CO., LTD., Saitama (JP)

(72) Inventor: Daesung Kim, Tochigi (JP)

(73) Assignee: YACHIYO INDUSTRY CO., LTD., Saitama (JP)

(*) Notice: Subject to any disclaimer, the term of this patent is extended or adjusted under 35 U.S.C. 154(b) by 0 days.

(21) Appl. No.: 16/606,022

(22) PCT Filed: Apr. 6, 2018

(86) PCT No.: PCT/JP2018/014805
§ 371 (c)(1),
(2) Date: Oct. 17, 2019

(87) PCT Pub. No.: WO2018/193883
PCT Pub. Date: Oct. 25, 2018

(65) Prior Publication Data
US 2020/0039347 A1    Feb. 6, 2020

(30) Foreign Application Priority Data
Apr. 19, 2017 (JP) ................ 2017-082526

(51) Int. Cl.
*B60K 15/04* (2006.01)

(52) U.S. Cl.
CPC .. *B60K 15/0406* (2013.01); *B60K 2015/0429* (2013.01)

(58) Field of Classification Search
USPC ....................... 220/86.2; 141/350
See application file for complete search history.

(56) References Cited

U.S. PATENT DOCUMENTS 4,715,509 A * 12/1987 Ito ................ B60K 15/04
141/59
5,538,055 A    7/1996 Kunz et al.
(Continued)

FOREIGN PATENT DOCUMENTS

JP    H07-96756 A    4/1995
JP    H07-96757 A    4/1995
(Continued)

OTHER PUBLICATIONS

International Search Report and Written Opinion of the International Search Report for PCT/JP2018/014805 dated Jun. 12, 2018.

*Primary Examiner* — Jessica Cahill
*Assistant Examiner* — Christopher M Afful
(74) *Attorney, Agent, or Firm* — Kenealy Vaidya LLP

(57) ABSTRACT

Provided is a fuel fill opening structure which includes: a holder which forms a fuel supply passage; a main on-off valve which is arranged in the holder, and opens or closes the fuel supply passage; a drain opening which is drilled on an upstream side from the main on-off valve of the holder; a drain flap which is pivotably arranged at a position to come in contact with a fuel gun inserted into the holder; and a drain on-off valve which pivots along with pivot of the drain flap to open or close the drain opening. A first pivot amount of the drain flap, which is pivoted by being brought in contact with the fuel gun, is set to be larger than a second pivot amount of the drain on-off valve required to close the drain opening.

4 Claims, 11 Drawing Sheets

(56) References Cited

U.S. PATENT DOCUMENTS

| | | | |
|---|---|---|---|
| 2002/0189691 A1* | 12/2002 | Morinaga | ........ B60K 15/03519 |
| | | | 137/588 |
| 2010/0270300 A1 | 10/2010 | Aso | |
| 2013/0341326 A1 | 12/2013 | Sasaki | |
| 2018/0170174 A1* | 6/2018 | Wakao | ................. B67D 7/3209 |

FOREIGN PATENT DOCUMENTS

| | | |
|---|---|---|
| JP | 2009-132242 A | 6/2009 |
| JP | 2012-162164 A | 8/2012 |
| JP | 2017-149342 A | 8/2017 |
| WO | 2018/193883 A1 | 10/2018 |

* cited by examiner

FUEL FILL OPENING STRUCTURE

CROSS-REFERENCE TO RELATED APPLICATIONS

[0001A] This application is a U.S. National Stage Application filed under 35 U.S.C § 371 of International Patent Application No. PCT/JP2018/014805 filed Apr. 6, 2018, which claims the benefit of priority to Japanese Patent Application No. 2017-082526 filed Apr. 19, 2017, the disclosures of all of which are hereby incorporated by reference in their entireties.

TECHNICAL FIELD

The present invention relates to a fuel fill opening structure of a capless type.

BACKGROUND ART

There has been a fuel fill opening structure of a capless type, which is provided in a fuel fill opening of a filler pipe. For example, in Patent Literature 1, a fuel fill opening structure is described, which includes a closing flap for opening or closing a fuel fill opening, a housing for covering a periphery of the fuel fill opening, and drain openings which are drilled upstream of the closing flap of the housing. With the fuel fill opening structure, dust and the like accumulated around the fuel fill opening are discharged outside through the drain openings and condensation inside is prevented.

The fuel fill opening structure described in Patent Literature 1 further includes, in the housing, a guide pipe which is movable along an insertion and removal direction of a fuel gun, a spring which biases the guide pipe toward a direction away from the fuel fill opening, and a packing mounted to an outer peripheral surface of the guide pipe.

According to the fuel fill opening structure of Patent Literature 1, normally when the fuel gun is not being inserted, the guide pipe and the packing are biased toward the direction away from the fuel fill opening by a biasing force of the spring to open the drain openings. Meanwhile, at the time of fueling, when the guide pipe is pushed by the fuel gun, the guide pipe and the packing are moved toward the fuel fill opening against the biasing force of the spring, to close the drain openings. This prevents vapor of fuel from being discharged outside at the time of fueling and prevents air (outside air) through the drain openings.

PRIOR ART DOCUMENT

Patent Literature

Patent Literature 1: Japanese Patent Application Publication No. H07-96756

SUMMARY OF THE INVENTION

Problems to be Solved by the Invention

The related art technology has a structure in which the guide pipe and the packing are moved along the insertion direction of the fuel gun at the time of fueling, and a biasing direction of the spring is set reversely to the insertion direction of the fuel gun so as to return the guide pipe and the packing to an open position after fueling. Therefore, to close the drain openings at the time of fueling, a user is required to maintain a state in which the fuel gun is strongly pressed against the guide pipe. That is, when a force to press the fuel gun against the guide pipe is insufficient, the drain openings remain unclosed at the time of fueling.

In other words, the related art has the structure in which the guide pipe and the packing are directly activated and moved in the same direction by the same distance with the contact by the fuel gun. Therefore, if a displacement of the guide pipe is insufficient due to insertion deviation or incomplete insertion of the fuel gun, a displacement of the packing is also insufficient, leading to a problem in that fuel is supplied while the drain openings are not being closed.

The present invention is made from such a viewpoint, and an object of the present invention is to provide a fuel fill opening structure capable of improving closing degree of a drain opening at the time of fueling.

To solve the problem described above, the present invention provides a fuel fill opening structure of a capless type, which is provided in a fuel fill opening of a filler pipe connected to a fuel tank, including: a fuel fill opening main body which forms a fuel supply passage; a main on-off valve which is arranged in the fuel fill opening main body, and opens or closes the fuel supply passage; a drain opening which is drilled on the upstream side from the main on-off valve of the fuel fill opening main body; a flap which is pivotally arranged at a position to come in contact with a fuel gun inserted into the fuel fill opening main body; and a drain on-off valve which pivots along with pivot of the flap to open or close the drain opening. A pivot amount of the flap, which is pivoted by being brought in contact with the fuel gun, is set to be larger than a pivot amount of the drain on-off valve required to close the drain opening.

According to the present invention, the flap and the drain on-off valve are pivoted along with each other in response to insertion of the fuel gun so that the drain opening can easily be closed. More particularly, according to the present invention, the flap, which is brought in directly contact with the fuel gun to be pivoted, and the drain on-off valve, which pivots along with the flap to open or close the drain opening, are provided. Further, the pivot amount of the flap, which is pivoted by being brought in contact with the fuel gun, is set to be larger than the pivot amount of the drain on-off valve required to close the drain opening. With the structure, the drain on-off valve can close the drain opening with the pivot amount smaller than that of the flap. Therefore, even when the pivot amount is insufficient due to insertion deviation or incomplete insertion of the fuel gun, the drain opening can be suitably closed by the drain on-off valve.

Further, it is preferable that a biasing member be provided, which biases the drain on-off valve toward a direction of opening the drain opening and biases the flap in the same direction as the drain on-off valve.

With the structure, the drain on-off valve can be retained at a position where the drain opening is opened, and hence dust and the like can be reliably discharged outside from the drain opening in normal times, and condensation inside can be reliably prevented. Further, the flap can be retained at the position where the fuel gun comes in contact so that the fuel gun can reliably be brought in contact with the flap.

Further, it is preferable that the drain on-off valve and the flap be biased by the biasing member which is common to the drain on-off valve and the flap.

With the structure, parts are reduced in number, to simplify the structure.

Still further, it is preferable that the biasing member integrally include: a flap fixing portion which is fixed to the flap; an on-off valve fixing portion which is fixed to the drain on-off valve; and a coupling portion which couples the flap fixing portion and the on-off valve fixing portion with each other, and is arranged to be pivotable with respect to the fuel fill opening main body, wherein an angle of the on-off valve fixing portion with respect to an insertion direction of the fuel gun is set to be smaller than an angle of the flap fixing portion with respect to the insertion direction of the fuel gun.

With the structure, when the flap and the flap fixing portion are pressed by the fuel gun, the coupling portion is pivoted, and the flap fixing portion and the flap are pivoted. Further, when the coupling portion is pivoted, the on-off valve fixing portion and the drain on-off valve are also pivoted. That is, the drain on-off valve can also be pivoted along with the pivot of the flap. A difference in pivot amounts between the drain on-off valve and the flap can be easily set by adjusting the angle of the on-off valve fixing portion and the angle of the flap fixing portion with respect to the insertion direction of the fuel gun.

Advantageous Effects of the Invention

According to the fuel fill opening structure of the present invention, closing degree of the drain opening at the time of fueling can be improved.

DETAILED DESCRIPTION OF THE INVENTION

Figure 1:
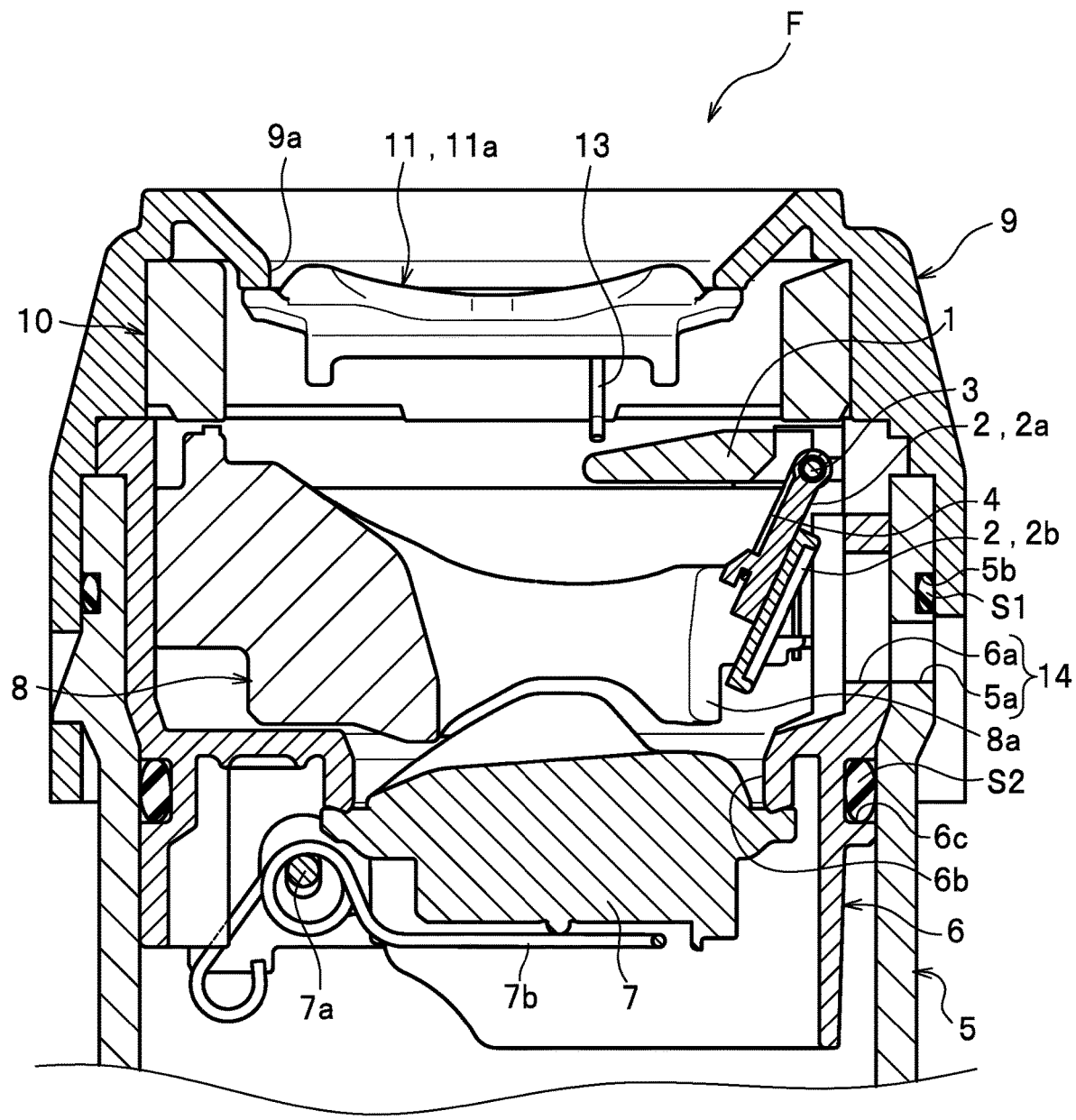
FIG. 1 is a schematic cross-sectional view of a fuel fill opening structure according to an embodiment of the present invention with a closed valve.

A description is given of an embodiment of the present invention with reference to the drawings. In the description, the same elements are denoted by the same reference numerals, and duplicate descriptions thereof are omitted.

Figure 2:
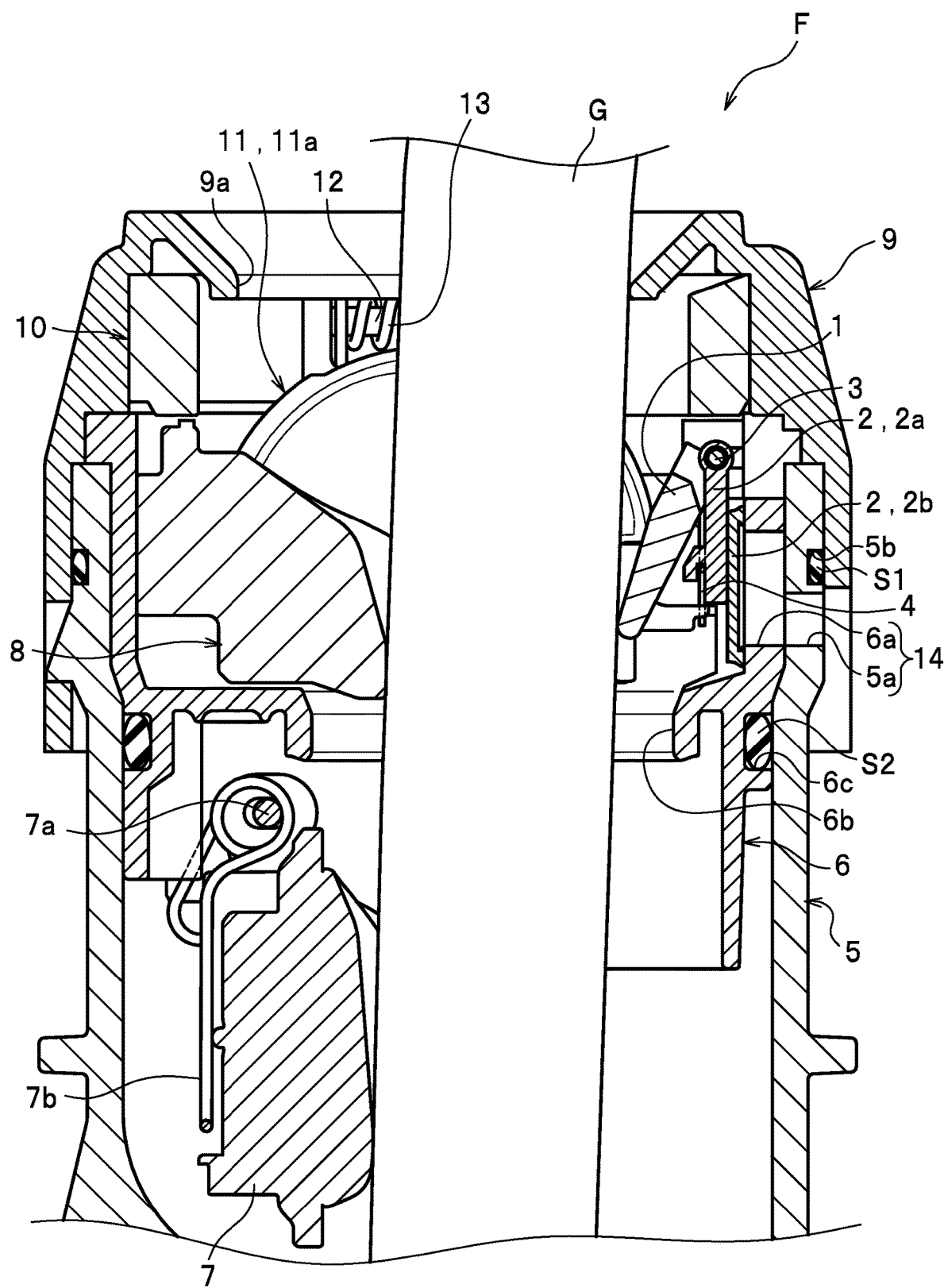
FIG. 2 is a schematic cross-sectional view of the fuel fill opening structure according to the embodiment of the present invention with an opened valve.

As illustrated in FIG. 1 and FIG. 2, a fuel fill opening structure F according to the embodiment is a fuel fill opening structure of a capless type, which is provided at a fuel fill opening of a filler pipe (not shown) connected to a fuel tank (not shown). The fuel fill opening structure F includes a holder 5, a casing 6, a main on-off valve 7, a guide bracket 8, and a cover 9. Further, the fuel fill opening structure F includes a dust bracket 10, a dust on-off valve 11, dust shafts 12 (see FIG. 2), and dust biasing members 13 (see FIG. 2). Still further, the fuel fill opening structure F includes a drain flap 1, a drain on-off valve 2, a drain shaft 3, and a drain biasing member 4. In the description below, an "upstream side" indicates a "near side in an insertion direction of the fuel gun," and a "downstream side" indicates a "far side in the insertion direction of the fuel gun."

The holder 5 is a cylindrical member to define a fuel supply passage. The holder 5 forms a "fuel fill opening main body" in appended claims. A downstream end of the holder 5 is connected to the fuel fill opening of the filler pipe. A holder discharge portion 5a is formed in a peripheral wall of the holder 5 to run through on the upstream side from the main on-off valve 7 in a radial direction. An annular groove portion 5b, in which a sealing member S1 is arranged, is formed in an outer peripheral surface of the holder 5 on the upstream side from the holder discharge portion 5a. In the present embodiment, an O-ring is used as the sealing member S1 to fluid-tightly and air-tightly keep a gap between the outer peripheral surface of the holder 5 and an inner peripheral surface of the cover 9.

The casing 6 is mounted upstream of an inner peripheral surface of the holder 5, and is a substantially cylindrical member to accommodate and retain the main on-off valve 7 and the guide bracket 8. A fuel fill opening portion 6b, which has a smaller diameter than other portions, is formed at a middle portion in the insertion direction of an inner peripheral surface of the casing 6. An upstream side of the casing 6 having the fuel fill opening portion 6b as a boundary is used as a space for arranging the guide bracket 8. A downstream side of the casing 6 having the fuel fill opening portion 6b as the boundary is used as a space for arranging the main on-off valve 7.

A casing discharge portion 6a is formed in the peripheral wall of the casing 6 to run through, on the upstream side from the main on-off valve 7 in the radial direction. The casing discharge portion 6a is formed at a position to communicate the holder discharge portion 5a. The casing discharge portion 6a forms, along with the holder discharge portion 5a, a drain opening 14 through which dust, condensation, and the like are discharged. An annular groove portion 6c, in which a sealing member S2 is arranged, is formed in the outer peripheral surface of the casing 6 on the downstream side from the casing discharge portion 6a. In the present embodiment, an O-ring is used as the sealing member S2 to fluid-tightly and air-tightly keep a gap between the outer peripheral surface of the casing 6 and the inner peripheral surface of the holder 5.

The main on-off valve 7 is a valve to open or close the fuel fill opening portion 6b. The main on-off valve 7 is pivotable in the insertion direction of the fuel gun G. The main on-off valve 7 is mounted to the casing 6 via a main on-off shaft 7a. The main on-off valve 7 is normally biased to pivot in a closing direction by a main on-off biasing member 7b.

The guide bracket 8 is a substantially cylindrical member which guides the insertion of the fuel gun G. A notch portion 8a, which is partly cut off, is formed in the peripheral wall of the guide bracket 8 to run therethrough in the radial direction. The notch portion 8a is formed at a position to correspond to the drain opening 14 in the radial direction. The notch portion 8a is a portion which allows the drain flap 1 or the drain on-off valve 2 to pivot.

The cover 9 is a substantially cylindrical member which covers a portion of an opening of the casing 6 at the upstream end. The cover 9 is fit onto the outer peripheral surface of the holder 5. The cover 9 extends more toward the upstream side than the holder 5 and the casing 6. A dust opening portion 9a, which extends annularly inward in the radial direction, is formed at an upstream end of the cover 9. The dust opening portion 9a has a smaller diameter as extending toward the downstream side.

Figure 3:
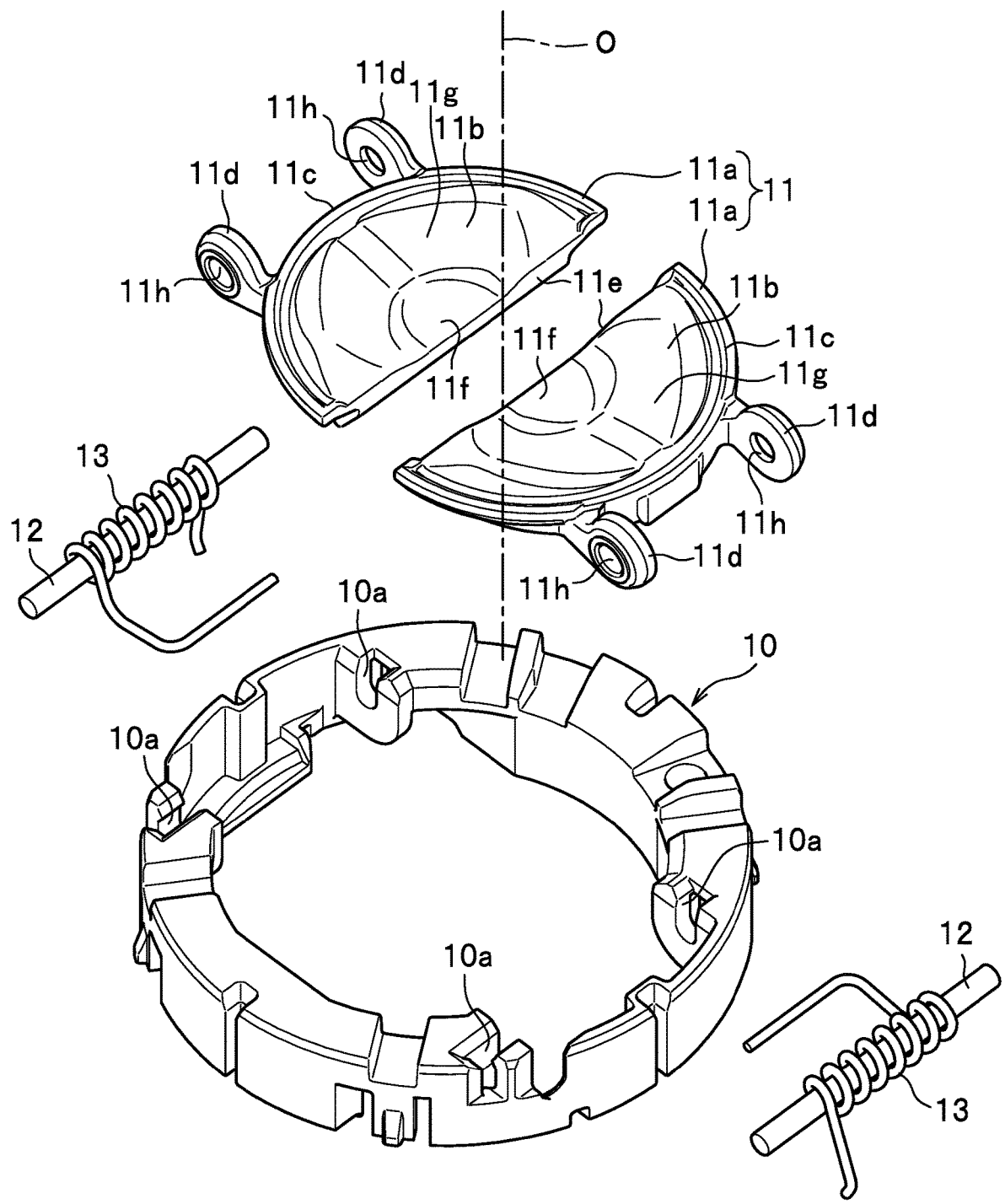
FIG. 3 is an exploded perspective view of a dust bracket, a dust on-off valve, dust shafts, and dust biasing members.
Figure 4:
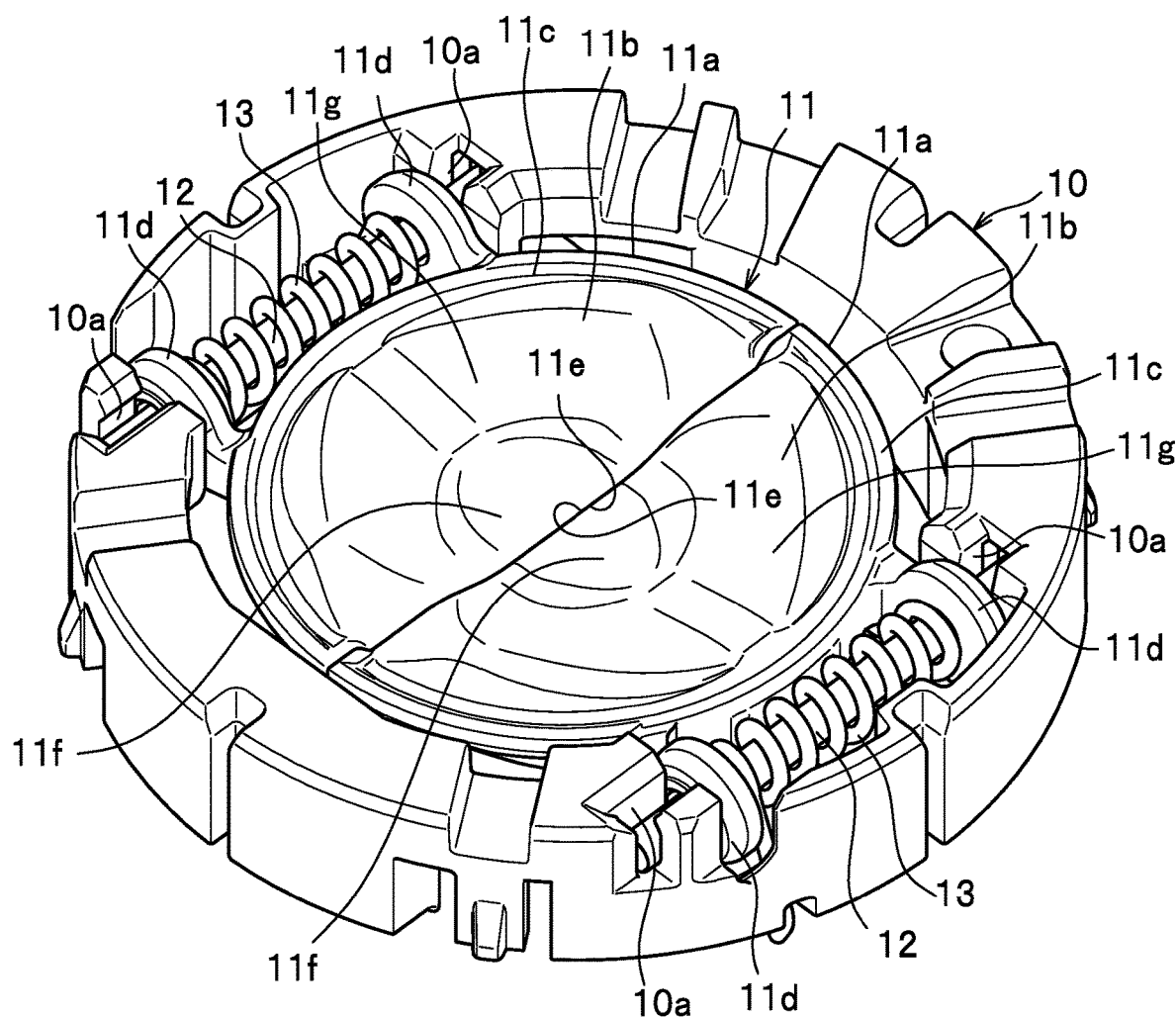
FIG. 4 is a perspective view of the dust bracket, the dust on-off valve, the dust shafts, and the dust biasing members being assembled.

The dust bracket 10 is a cylindrical member to retain the dust on-off valve 11. The dust bracket 10 is mounted on an inner peripheral surface of the cover 9 on the upstream from the guide bracket 8. As illustrated in FIG. 3 and FIG. 4, four support portion 10a, which are open toward the upstream side and are in a recessed groove shape, are formed in a peripheral wall of the dust bracket 10. Two support portions 10a form a pair and support both ends of the dust shaft 12 so as not to be pivoted in the axial direction.

As illustrated in FIG. 1 and FIG. 2, the dust on-off valve 11 is a valve to open or close the dust opening portion 9a. As illustrated in FIG. 3 and FIG. 4, the dust on-off valve 11 is a biparting valve formed with a pair of dust flaps 11a in the present embodiment. A symbol O in FIG. 3 schematically indicates a center axis of the dust opening portion 9a (see FIG. 1 and FIG. 2). The pair of dust flaps 11a is in line symmetry about the center axis O. The dust flap 11a is pivotable in the insertion direction of the fuel gun. The dust flap 11a includes an opening and closing plate portion 11b, a peripheral wall portion 11c, and a plurality of mount portions 11d.

The opening and closing plate portion 11b, when closed, extends in a direction substantially orthogonal to the center axis O. The opening and closing plate portion 11b has a substantially semi-circular shape in planar view. A straight edge portion 11e of the opening and closing plate portion 11b is formed along the radial direction about the center axis O. The straight edge portions 11e of the pair of dust flaps 11a abut to each other to close the dust opening portion 9a. An orthogonal planar portion 11f extending in a direction orthogonal to the center axis O and having a substantially semi-circular shape is formed around a middle portion of the straight edge portion 11e of the opening and closing plate portion 11b. An inclined surface 11g is formed, which is inclined with respect to the insertion direction of the fuel gun G, at a portion between the orthogonal planar portion 11f and the peripheral wall portion 11c. The inclined surface 11g is gradually inclined so as to be more the downstream as extending from the peripheral wall portion 11c to the orthogonal planar portion 11f. The peripheral wall portion 11c is formed along a peripheral edge portion in an arc shape of the opening and closing plate portion 11b.

A pair of mount portions 11d is formed in each dust flap 11a in the present embodiment. The pair of mount portions 11d is formed to protrude outward in the radial direction from a portion opposite to the straight edge portion 11e of the outer peripheral surface of the peripheral wall portion 11c. The mount portions 11d are formed to be apart from each other. The mount portion 11d has a disk shape. The mount portion 11d has a mount hole 11h in a circular shape through which the dust shaft 12 penetrates. The mount portion 11d is formed to be pivotable about the dust shaft 12.

Each dust shaft 12 is a member about which the dust flap 11a pivots and which retains the dust biasing member at a predetermined position. The dust shaft 12 has a columnar shape in the present embodiment. The dust shaft 12 is inserted in two support portions 10a so as not to be rotated.

The dust biasing member 13 is a spring which normally biases the dust flap 11a so as to be pivoted in the closing direction. The spring used as the dust biasing member 13 is not particularly limited, and a return coil spring is used in the present embodiment. The dust shaft 12 is inserted in a cylindrical coil portion of the dust biasing member 13. One end of the dust biasing member 13 is engaged with a rear surface of the dust flap 11a. The other end of the dust biasing member 13 is engaged with an appropriate portion on the peripheral wall of the dust bracket 10.

Figure 5:
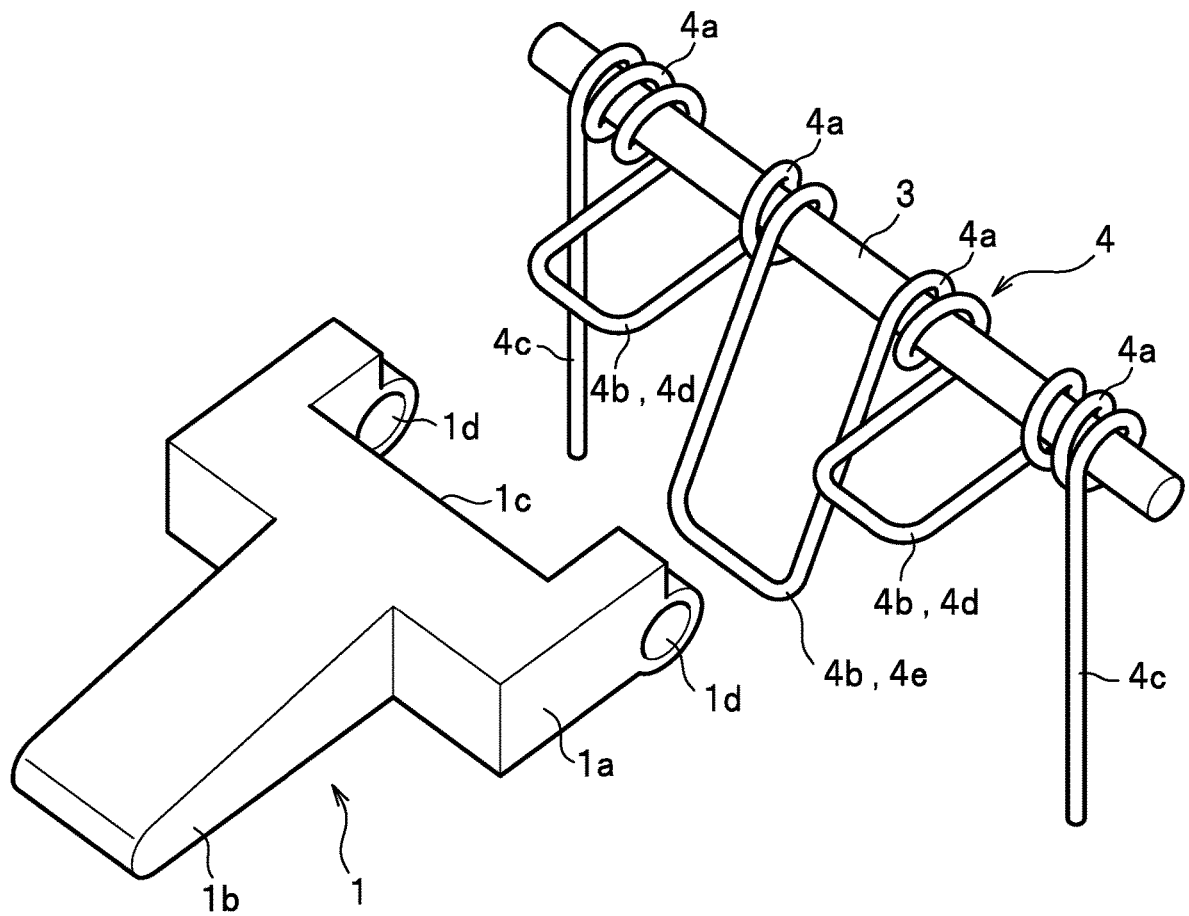
FIG. 5 is an exploded perspective view of a drain flap, a drain on-off valve, the drain shaft, and the drain biasing member.
Figure 5:
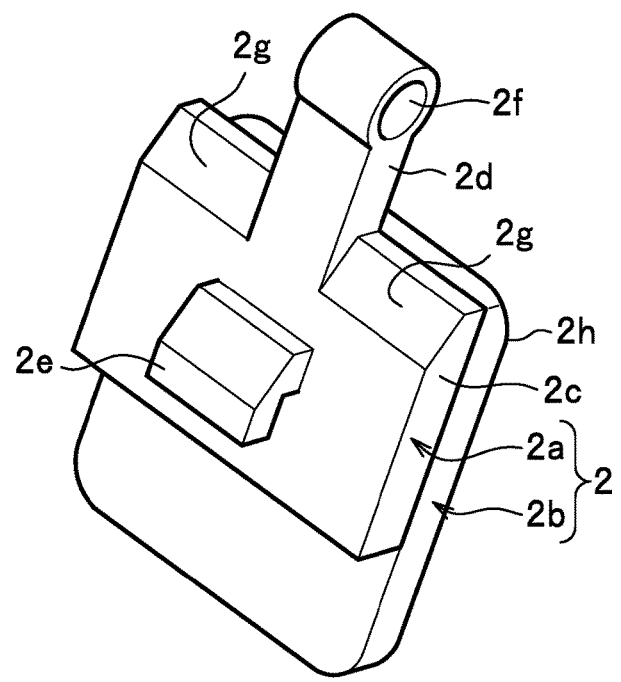
Figure 6:
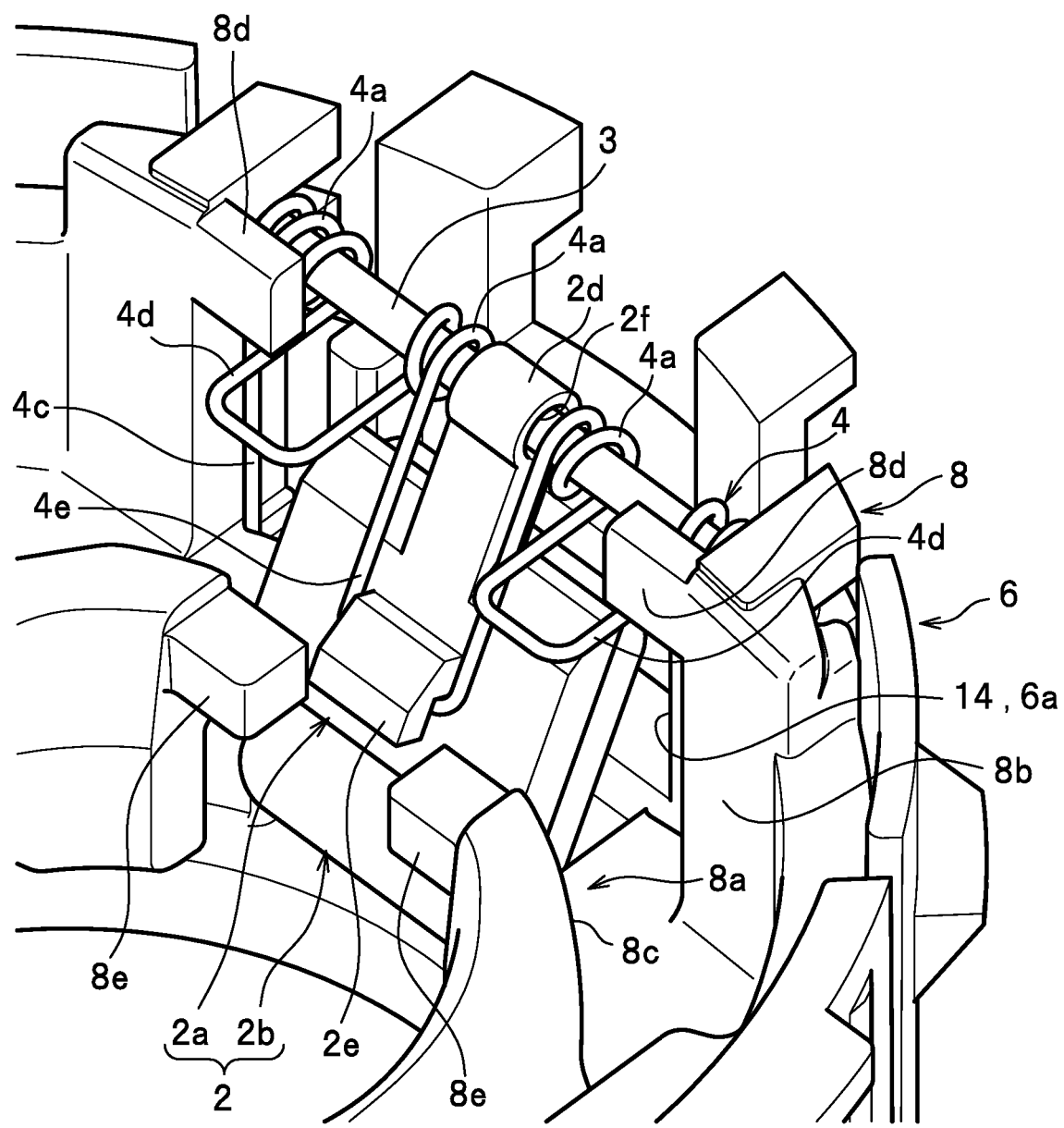
FIG. 6 is a partially enlarged perspective view of a vicinity of a drain opening.
Figure 7:
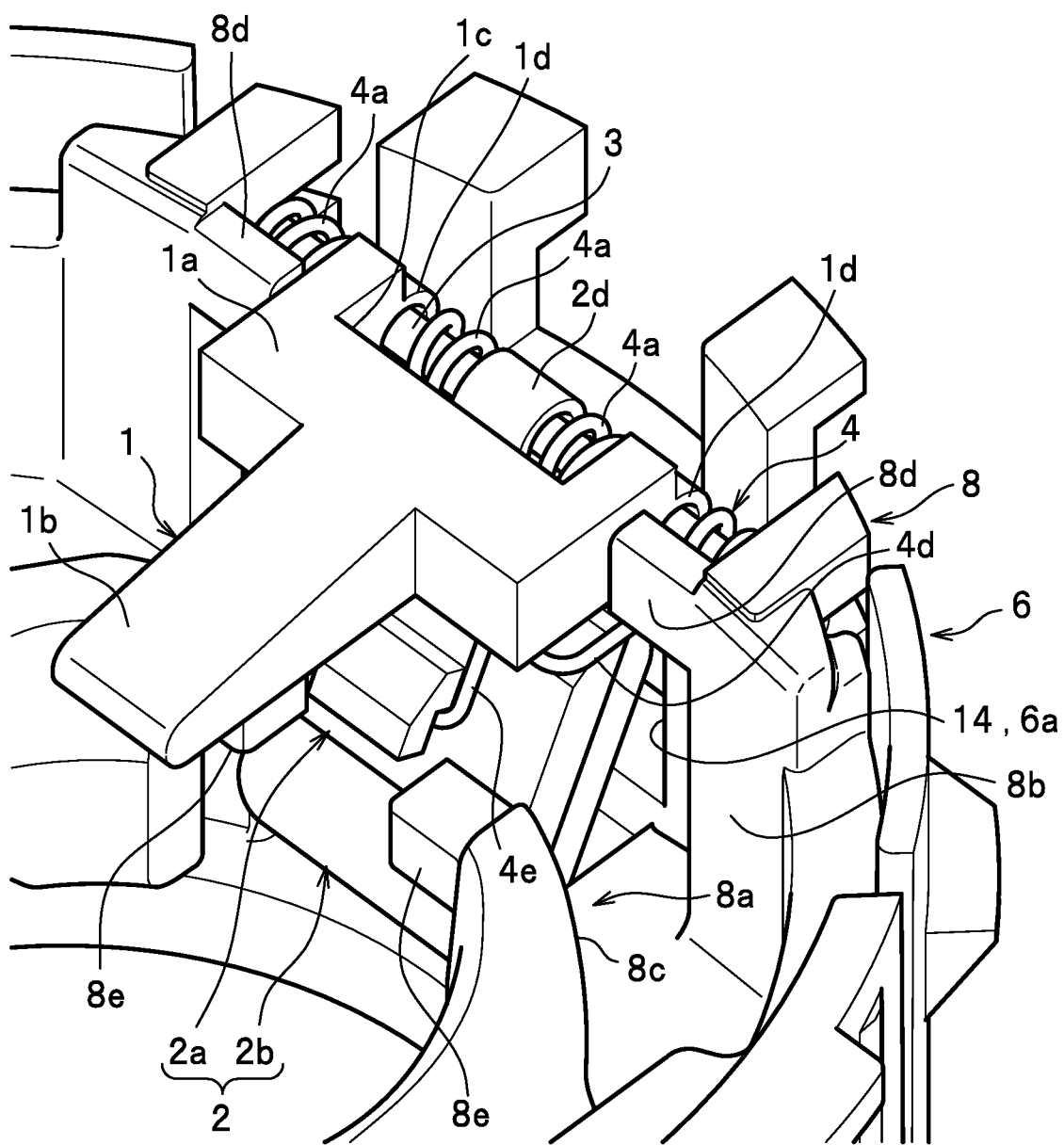
FIG. 7 is a partially enlarged perspective view of the drain flap being assembled to the drain shaft and the drain biasing member in FIG. 6, where the drain flap and the drain on-off valve are at an open position.

As illustrated in FIG. 5 to FIG. 7, the drain biasing member 4 is a member which normally biases the drain on-off valve 2 so as to be pivoted in a direction to open the drain opening 14 and normally biases the drain flap 1 so as to be pivoted in the same direction as the drain on-off valve 2. The drain biasing member 4 in FIG. 5 is formed of one spring bent in a predetermined shape. That is, the drain on-off valve 2 and the drain flap 1 are biased by the common drain biasing member 4. The drain biasing member 4 integrally includes a plurality of bias coupling portions 4a, a plurality of fixing portions 4b, and two arm portions 4c.

The bias coupling portion 4a is a portion to be coupled to the drain shaft 3 and is a cylindrical coil portion in the present embodiment. The number of bias coupling portion 4a is not particularly limited, but four bias coupling portions 4a are formed to be apart from each other in the present embodiment. The bias coupling portions 4a are formed to be rotatable about the drain shaft 3.

The fixing portions 4b are portions which have a U-shape and protrude inward in the radial direction than the bias coupling portions 4a. The fixing portion 4b is formed between the adjacent bias coupling portions 4a. That is, the fixing portions 4b and the bias coupling portions 4a are alternately arranged along the axis direction of the drain shaft 3. The number of fixing portions 4b is not particularly limited, but three fixing portions 4b are formed to be apart from each other in the present embodiment. The fixing portion 4b at the center is fixed to the drain on-off valve 2. The remaining two fixing portions 4b on outer sides are fixed to the drain flap 1. When the three fixing portions 4b needs to be differentiated, the fixing portions are referred to as flap fixing portions 4d and an on-off valve fixing portion 4e. The on-off valve fixing portion 4e and the flap fixing portions 4d are coupled to each other by the bias coupling portions 4a. The on-off valve fixing portion 4e is set to have a protrusion amount larger than that of the flap fixing portions 4d. The number of on-off valve fixing portion 4e or flap fixing portions 4d may be appropriately increased or decreased.

The two arm portions 4c are portions which linearly extend at one end and the other end of the drain biasing member 4. The arm portions 4c are engaged with appropriate portions of the peripheral wall of the guide bracket 8 (see FIG. 6).

The drain flap 1 is arranged at a position to come in contact with the fuel gun G, and is a member to be pivotable in the insertion direction of the fuel gun G. As illustrated in FIG. 5 and FIG. 7, the drain flap 1 integrally includes a flap base portion 1a and a flap contact portion 1b. In the description below, a surface facing the near side in the insertion direction of the fuel gun G is referred to as a "front surface" and a surface facing the far side in the insertion direction of the gun G is referred to as a "rear surface" when the drain flap 1 is at an open position. Further, a surface facing inside in the radial direction is referred to as an "inner end surface" and a surface facing outside in the radial direction is referred to as an "outer end surface" in the drain flap 1 at the open position.

The flap base portion 1a is a substantially rectangular parallelepiped portion to be fixed to the flap fixing portions 4d. The flap base portion 1a includes a relief portion 1c at the center in the outer end surface of the flap base portion 1a to avoid contacting with the bias coupling portions 4a or the on-off valve fixing portion 4e. A pair of flap coupling portions 1d are arranged to protrude outward at both ends having the relief portion 1c therebetween at the outer end surface of the flap base portion 1a. The flap coupling portions 1d are cylindrical portions through which the drain shaft 3 penetrates. The flap coupling portions 1d are formed to be pivotable about the drain shaft 3.

The flap contact portion 1b is a portion which is directly brought in contact with the fuel gun G. The flap contact portion 1b is arranged to protrude inward from the center portion on the inner end surface of the flap base portion 1a. A distal end of the flap base portion 1a is formed in a curved shape to protrude inward in the radial direction. A front surface of the flap base portion 1a is inclined so as to be more downstream as extending inward in the radial direction. The distal end shape and the front surface shape improve slidability of the flap contact portion 1b with respect to the fuel gun G so that the drain flap 1 is easily pressed by the fuel gun G.

The drain on-off valve 2 is a valve which pivots along with the drain flap 1 to open or close the drain opening 14. The drain on-off valve 2 is pivotable in the radial direction. As illustrated in FIG. 5 and FIG. 6, the drain on-off valve 2 includes a drain valve body 2a and the drain seal member 2b. In the description below, a surface facing inside in the radial direction is referred to as a "front surface" and a surface facing outside in the radial direction is referred to as a "rear surface" when the drain on-off valve 2 is at an open position. Further, a surface on a near side in the insertion direction of the fuel gun G is referred to as an "upstream end surface" and a surface on a far side in the insertion direction of the fuel gun G is referred to as a "downstream end surface" when the drain on-off valve 2 is at the open position.

The drain valve body 2a is a member to retain the drain seal member 2b and is formed of a material harder than the drain seal member 2b. The drain valve body 2a integrally includes a valve body base portion 2c and a valve coupling portion 2d.

The valve body base portion 2c is a portion having a substantially rectangular shape to be fixed to the on-off valve fixing portion 4e. A spring engagement portion 2e having a hook shape is formed to protrude at the center of the front surface of the valve body base portion 2c. The distal side of the on-off valve fixing portion 4e is hooked to and engaged with the spring engagement portion 2e. Inclined surfaces 2g are formed at both ends having the valve coupling portion 2d therebetween on the front surface of the valve body base portion 2c to avoid contacting with the flap fixing portions 4d. The inclined surface 2g is inclined so as to be more downstream as extending inward in the radial direction.

The valve coupling portion 2d is a portion to be coupled to the drain shaft 3. The valve coupling portion 2d is arranged to protrude upstream from the center portion of the upstream end surface of the valve body base portion 2c. The valve coupling portion 2d has a square pipe shape. A coupling hole 2f in a circular shape is formed, through which the drain shaft 3 penetrates, at an end of the valve coupling portion 2d. The valve coupling portion 2d is formed to be pivotable about the drain shaft 3.

The drain seal member 2b is arranged on a rear surface of the valve body base portion 2c and is a member which closes the drain opening 14 at the time of fueling. The drain seal member 2b is formed of a soft material such as rubber. The drain seal member 2b has a rectangular plate shape. The drain seal member 2b extends downstream more than the drain valve body 2a. A pressure contact portion 2h (see FIG. 9) in a square ring shape is arranged to protrude on a peripheral edge of a rear surface of the drain seal member 2b. The pressure contact portion 2h is a portion to come in pressure-contact with and seal a peripheral edge of the drain opening 14.

As illustrated in FIG. 6 and FIG. 7, the drain flap 1 and the drain on-off valve 2 are arranged inside the notch portion 8a formed in the peripheral wall of the guide bracket 8. An outer wall portion 8b and an inner wall portion 8c are formed at portions adjacent to the notch portion 8a in the peripheral wall of the guide bracket 8 so as to be separated from each other in the radial direction. A pair of first stopper portions 8d is arranged to protrude inward on the outer wall portion 8b. A pair of second stopper portions 8e is arranged to protrude inward on the inner wall portion 8c. Each of the stopper portions 8d and 8e has a square pole shape. The first stopper portion 8d is arranged on an upstream side and at an outer side in the radial direction with respect to the second stopper portions 8e, so as to be separated from each other. The first stopper portions 8d come in contact with the flap fixing portions 4d at the open position to restrict the flap fixing portions 4d and the drain flap 1 from pivoting in the opening direction. The second stopper portions 8e come in contact with the drain on-off valve 2 at the open position to restrict the drain on-off valve 2 and the on-off valve fixing portion 4e from pivoting in the opening direction. The arm portions 4c at one end and the other end of the drain biasing member 4 are engaged with the peripheral wall of the guide bracket 8 so that the fixing portions 4b can be retained at a predetermined angle, and hence the first stopper portion 8d and the second stopper portion 8e may be omitted.

As illustrated in FIG. 7, the drain shaft 3 is a member about which the drain flap 1 and the drain on-off valve 2 pivot and which retains the drain biasing member 4 at a predetermined position. The drain shaft 3 has a columnar shape or a cylindrical shape. The drain shaft 3 penetrates the flap coupling portions 1d, the valve coupling portion 2d, and the bias coupling portions 4a. Both ends of the drain shaft 3 are supported on appropriate portions in the peripheral wall of the guide bracket 8 so as not to be pivoted.

Figure 8:
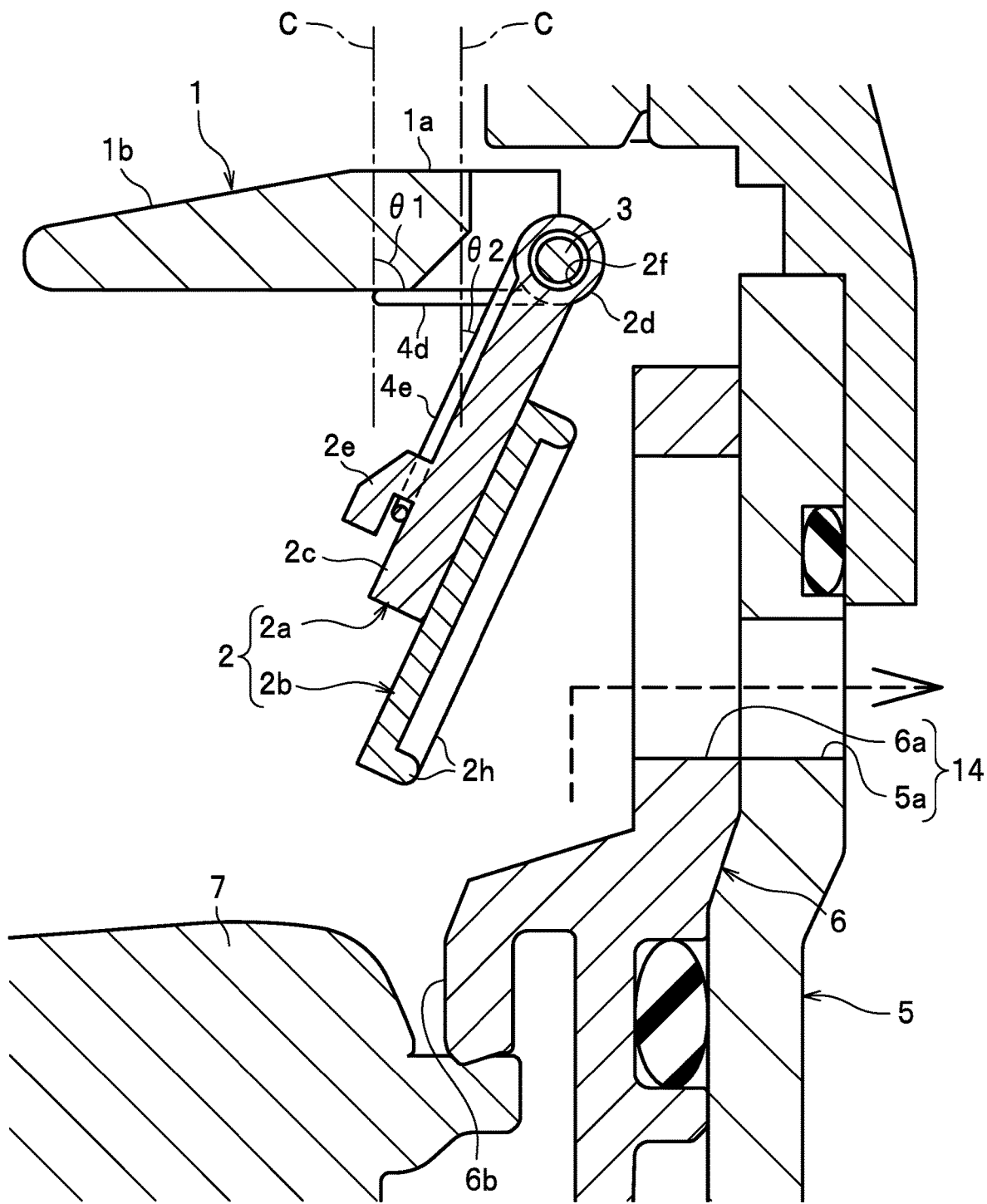
FIG. 8 is a partially enlarged cross-sectional view of the drain flap and the drain on-off valve being at the open position in normal times without a fueling gun inserted.
Figure 9:
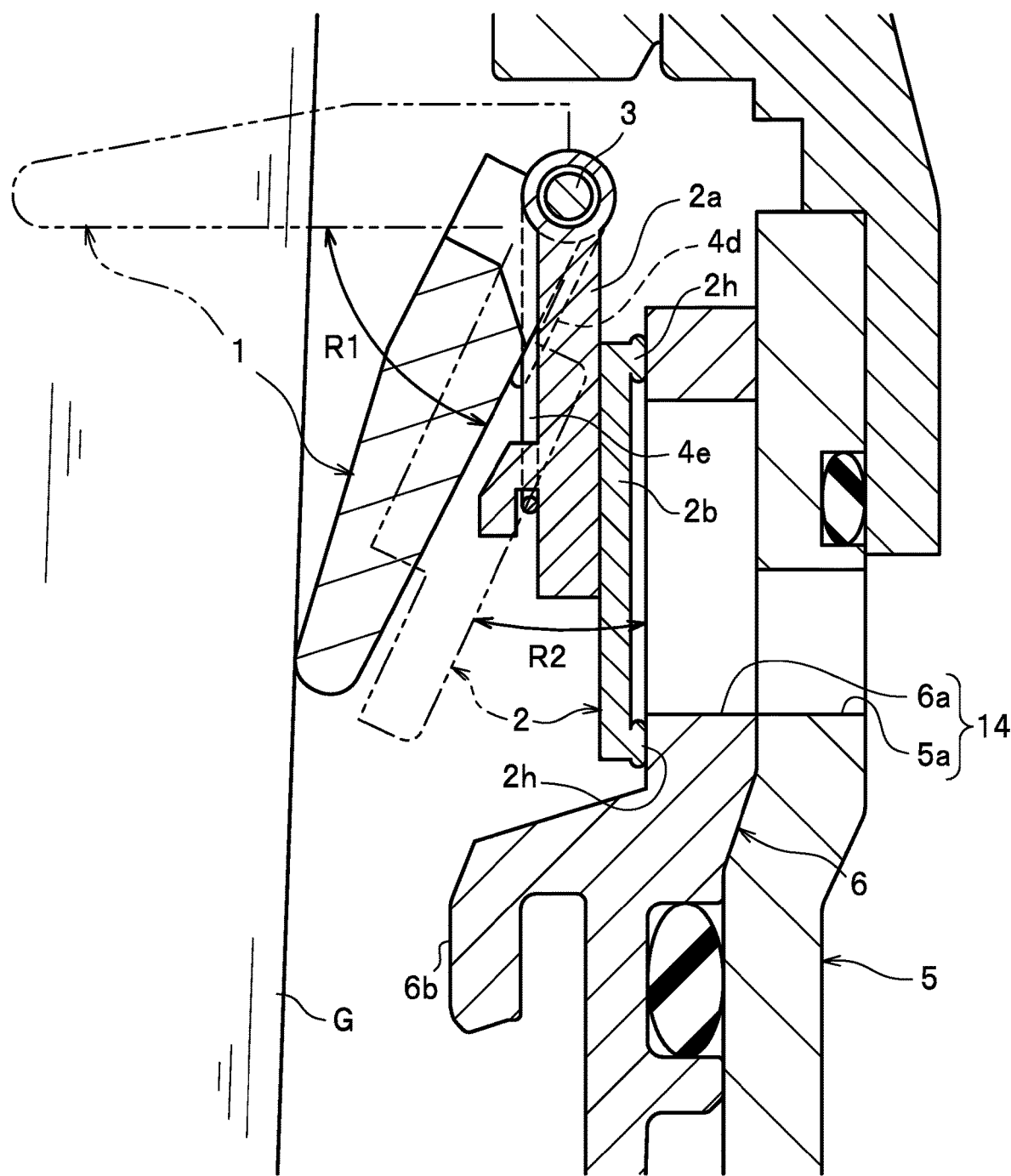
FIG. 9 is a partially enlarged cross-sectional view of the drain flap and the drain on-off valve being at a closed position at the time of fueling with the fueling gun inserted.

Next, with reference to FIG. 8 and FIG. 9, the flap fixing portions 4d, the drain flap 1, the on-off valve fixing portion 4e, and the drain on-off valve 2 are described in detail. A dashed arrow line in FIG. 8 indicates a discharge direction of dust and the like. A two-dot chain line in FIG. 9 indicates the drain flap 1 and the drain on-off valve 2 at the open position.

The flap fixing portions 4d and the drain flap 1 at the open position in FIG. 8 are orthogonal or substantially orthogonal to an insertion direction C of the fuel gun G. The flap contact portion 1b protrudes to a vicinity of the center of the fuel gun G in the present embodiment. The flap contact portion 1b may be set to have a sufficient length to an extent to come in contact with the fuel gun G. The on-off valve fixing portion 4e and the drain on-off valve 2 at the open position are inclined so as to be more downstream as extending inward in the radial direction, and are inclined at a small angle with respect to the insertion direction C of the fuel gun G. An angle θ2 of the on-off valve fixing portion 4e with respect to the insertion direction C of the fuel gun G is set to be smaller than an angle θ1 of the flap fixing portions 4d with respect to the insertion direction C of the fuel gun G. The on-off valve fixing portion 4e at the open position is arranged closer to the drain opening 14 than the flap fixing portions 4d.

A pivot amount of the drain flap 1 since the drain flap 1 illustrated in FIG. 9 comes in contact with a distal end of the fuel gun G until the drain flap 1 comes in contact with an outer peripheral surface of the fuel gun G, that is, the pivot amount required for the drain flap 1 to allow the fuel gun G to be inserted is referred to as a first pivot amount R1. A pivot amount required for the drain on-off valve 2 to close the drain opening 14 is referred to as a second pivot amount R2. The first pivot amount R1 is set to be larger than the second pivot amount R2 (R1>R2). Conversely, the second pivot amount R2 is set to be smaller than the first pivot amount R1, and the drain on-off valve 2 can close the drain opening 14 with a smaller pivot amount. In other words, the drain on-off valve 2 is configured to close the drain opening 14 before the drain flap 1 comes in contact with the outer peripheral surface of the fuel gun G.

Next, with reference to FIG. 2, FIG. 7, FIG. 10, and FIG. 11, an operation of the fuel fill opening structure F of the present embodiment will be described.

Normal Times

FIG. 7 illustrates a state in which the drain flap 1 and the drain on-off valve 2 are at the open position by the biasing force of the drain biasing member 4 in normal times with the fuel gun G not inserted. In the state, the drain flap 1 and the flap fixing portions 4d are orthogonal or substantially orthogonal to the insertion direction of the fuel gun, and the drain on-off valve 2 and the on-off valve fixing portion 4e are inclined at a small angle with respect to the insertion direction of the fuel gun. The drain on-off valve 2 is apart from the drain opening 14, and the drain opening 14 is open.

Fueling Time

As illustrated in FIG. 2, when the fuel gun G is inserted and the dust on-off valve 11 is pressed by the distal end of the fuel gun G, the pair of dust flaps 11a is pivoted in the opening direction against the biasing force of the dust biasing members 13. Accordingly, the dust opening portion 9a is opened.

Figure 10:
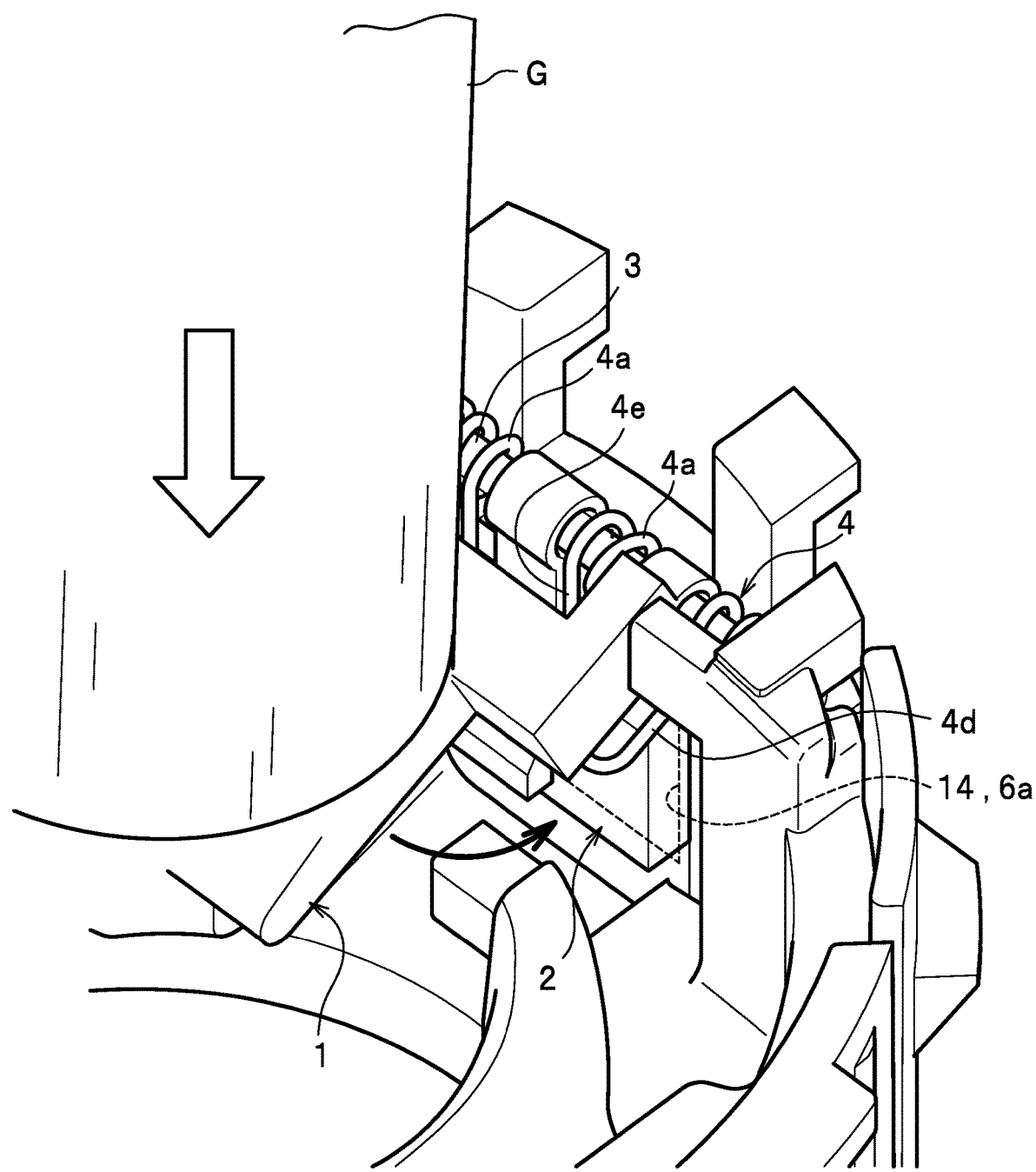
FIG. 10 is a partially enlarged perspective view of the drain flap being at the open position and the drain on-off valve being at the closed position at the time of fueling with the fuel gun inserted.

Then, as illustrated in FIG. 10, when the drain flap 1 and the flap fixing portions 4d are pressed by the distal end of the fuel gun G against the biasing force of the drain biasing member 4, the bias coupling portions 4a are rotated about the drain shaft 3, with the result that the drain flap 1 and the flap fixing portions 4d are pivoted in the closing direction (direction to close the drain opening 14). On this occasion, the bias coupling portions 4a are rotated so that the on-off valve fixing portion 4e and the on-off valve 2 are also pivoted in the closing direction. That is, the drain on-off valve 2 is also pivoted simultaneously in the same direction along with the pivot of the drain flap 1. The drain flap 1 and the drain on-off valve 2 are not brought in direct contact to each other, and are pivoted by a reaction force of the drain biasing member 4.

In the present embodiment, the second pivot amount R2 required for the drain on-off valve 2 to close the drain opening 14 is set to be smaller than the first pivot amount R1 required for the drain flap 1 to allow the fuel gun G to be inserted. Therefore, when the fuel gun G is pressed more than a predetermined amount, the drain on-off valve 2 closes the drain opening 14 before the drain flap 1 comes in contact with the outer peripheral surface of the fuel gun G. On this occasion, the pressure contact portion 2h of the drain seal member 2b is pressure-contacted with the peripheral edge of the drain opening 14 for sealing (see FIG. 9). The drain flap 1 and the drain on-off valve 2 have substantially the same pivot amount until the drain on-off valve 2 closes the drain opening 14.

Figure 11:
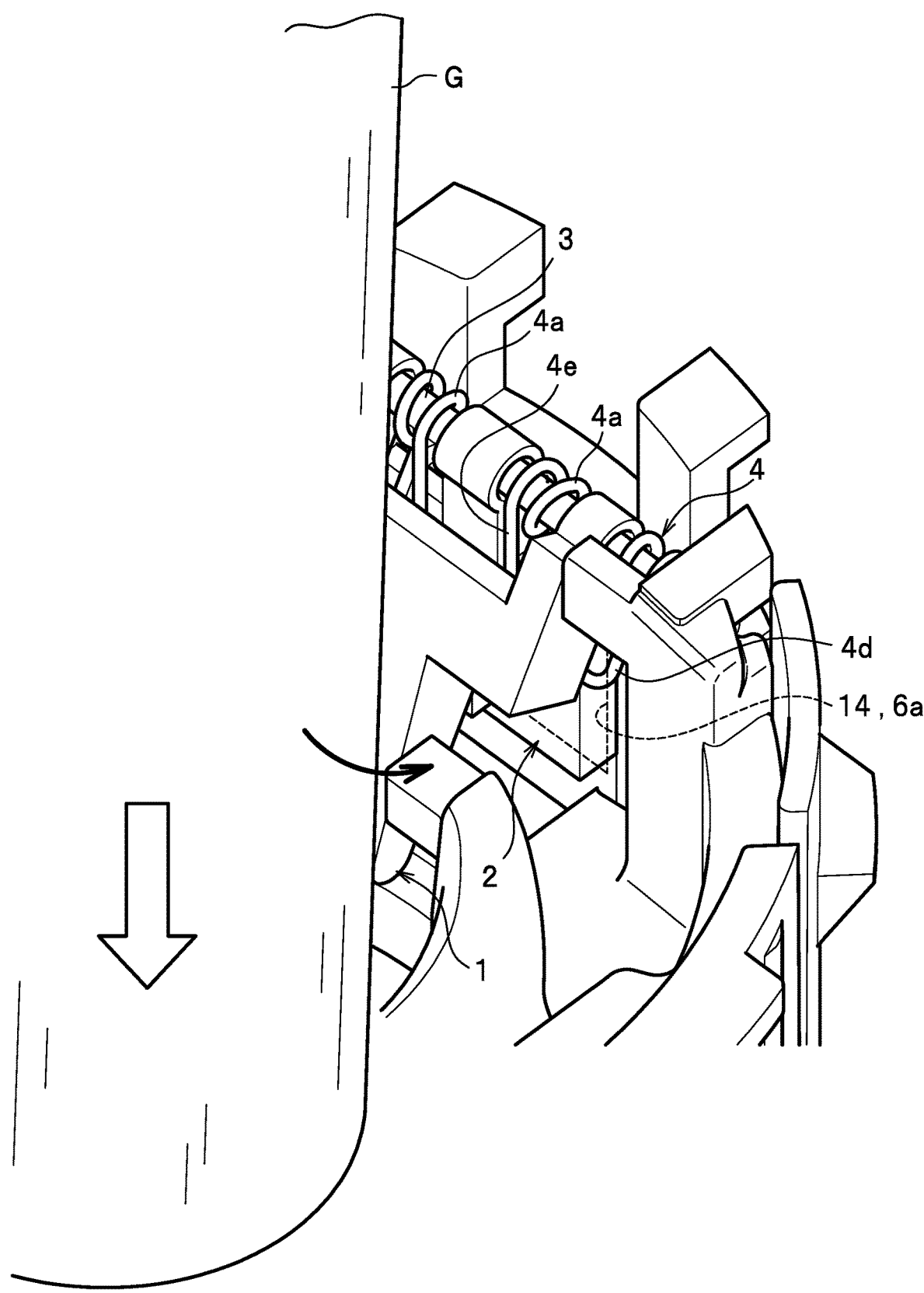
FIG. 11 is a partially enlarged perspective view of the drain flap and the drain on-off valve being at the closed position at the time of fueling with the fueling gun inserted.

As illustrated in FIG. 10 and FIG. 11, when the drain on-off valve 2 closes the drain opening 14, only the drain flap 1 is pivoted in the closing direction in response to the insertion of the fuel gun G. When the fuel gun G is further pressed down, the drain flap 1 is pivoted to come in contact with the outer peripheral surface of the fuel gun G so that the fuel gun G is allowed to be inserted more toward a far side. In a state in which only the drain flap 1 is pivoted after the drain opening 14 is closed, the reaction force of the drain biasing member 4 becomes larger, with the result that the drain on-off valve 2 comes in contact more closely with the drain opening 14.

According to the present embodiment described above, the drain flap 1 and the drain on-off valve 2 pivot along with each other in response to the insertion of the fuel gun G, and hence the drain opening 14 can be easily closed. More particularly, the present embodiment includes the drain flap 1 which directly comes in contact with the fuel gun G to be pivoted, and the drain on-off valve 2 which pivots along the drain flap 1 to open or close the drain opening 14. Further, the first pivot amount R1 of the drain flap 1, which is pivoted by being contacted with the fuel gun G, is set to be larger than the second pivot amount R2 of the drain on-off valve 2 required to close the drain opening 14. Accordingly, the drain on-off valve 2 can close the drain opening 14 with a smaller pivot amount than the drain flap 1. Therefore, even when the pivot amount of the drain flap 1 is insufficient due to insertion deviation or incomplete insertion of the fuel gun G, the drain opening 14 can be suitably closed by the drain on-off valve 2.

Further, according to the present embodiment, the drain biasing member 4 integrally includes the flap fixing portions 4d fixed to the drain flap 1, the on-off valve fixing portion 4e fixed to the drain on-off valve 2, and the bias coupling portions 4a which couple the flap fixing portions 4d and the on-off valve fixing portion 4e with each other and are arranged to be pivotable. Therefore, the drain on-off valve 2 can also be pivoted simultaneously along with the pivot of the drain flap 1. Further, a difference between the pivot amounts of the drain on-off valve 2 and the drain flap 1 can be easily set only by adjusting the angle θ2 of the on-off valve fixing portion 4e and the angle θ1 of the flap fixing portions 4d with respect to the insertion direction C of the fuel gun G.

Further, according to the present embodiment, the drain opening 14 is opened in normal times, and hence dust and the like which are accumulated around the fuel fill opening portion 6b can be discharged outside through the drain opening 14 and condensation can be prevented. Still further, at the time of fueling, the drain opening 14 is closed by the drain on-off valve 2, and hence vapor of the fuel is prevented from flowing outside and air is prevented from flowing through the drain opening 14 to the fuel supply passage. At a gas station having equipment for collecting (sucking) the vapor of the fuel, when air flows through the drain opening 14 into the fuel supply passage, the air mixes with the vapor of the fuel. Therefore, there may be a case in which the collecting equipment detects abnormality to stop fueling. Meanwhile, according to the present embodiment, air flow through the drain opening 14 into the fuel supply passage is prevented at the time of fueling and the collecting equipment is prevented from stopping.

Further, according to the present embodiment, the drain on-off valve 2 can be retained by the drain biasing member 4 at the position where the drain opening 14 is opened, and hence dust and the like can be reliably discharged outside from the drain opening 14 in normal times, and condensation inside can be reliably prevented. Still further, the drain flap 1 can be retained by the drain biasing member 4 at the position where the fuel gun G comes in contact, the fuel gun G can be reliably brought in contact with the drain flap 1 at the time of fueling. Yet further, looseness of the drain on-off valve 2 and the drain flap 1 due to vibration of the vehicle or the like can be restrained by biasing the drain on-off valve 2 and the drain flap 1 with the drain biasing member 4.

Further, according to the present embodiment, the drain on-off valve 2 and the drain flap 1 are biased by the common drain biasing member 4 so that parts can be reduced in number to simplify the structure.

The embodiment of the present invention is described above, but the present invention is not limited thereto and can be modified as appropriate within a scope of the present invention. In the present embodiment, the fuel gun G directly comes in contact with the drain flap 1 to pivot the drain flap 1, and the drain on-off valve 2 is pivoted along with the pivot of the drain flap 1, but the present invention is not limited thereto. For example, the dust on-off valve 11, which is pushed and pivoted by the fuel gun G, may directly come in contact with the drain flap 1 to pivot the drain flap 1. Further, the drain flap 1 may be omitted, and the dust on-off valve 11 may directly or indirectly come in contact with the drain on-off valve 2 to pivot the drain on-off valve 2. In the structure described above, the dust on-off valve 11 corresponds to a "flap" in appended claims. In the structure described above, a distance between the dust on-off valve 11 and the drain flap 1 or the drain on-off valve 2 may be set shorter, or the dust on-off valve 11 may be formed of a single elongated dust flap so that the dust on-off valve 11 can come in contact with the drain flap 1 or the drain on-off valve 2. Further, in the present embodiment, the drain biasing member 4 is a single member, but may be separately arranged in the drain on-off valve 2 and the drain flap 1.

REFERENCE NUMERALS

F fuel fill opening structure
G fuel gun
1 drain flap (flap)
2 drain on-off valve
4 drain biasing member (biasing member)
4a bias coupling portion (coupling portion)
4d flap fixing portion
4e on-off valve fixing portion
5 holder (fuel fill opening main body)
7 main on-off valve
11 dust on-off valve (flap)
14 drain opening

The invention claimed is:

1. A fuel fill opening structure of a capless type, which is provided in a fuel fill opening of a filler pipe connected to a fuel tank, comprising:
   a fuel fill opening main body which forms a fuel supply passage;
   a main on-off valve which is arranged in the fuel fill opening main body, and opens or closes the fuel supply passage;
   a drain opening which is drilled on an upstream side from the main on-off valve of the fuel fill opening main body;
   a flap which is pivotably arranged at a position to come in contact with a fuel gun inserted into the fuel fill opening main body; and
   a drain on-off valve which pivots along with pivot of the flap to open or close the drain opening,
   wherein a pivot amount of the flap, which is pivoted by being brought in contact with the fuel gun, is set to be larger than a pivot amount of the drain on-off valve required to close the drain opening.

2. The fuel fill opening structure of a capless type as claimed in claim 1, further comprising a biasing member which biases the drain on-off valve toward a direction of opening the drain opening and biases the flap in a same direction as the drain on-off valve.

3. The fuel fill opening structure of a capless type as claimed in claim 2, wherein the drain on-off valve and the flap are biased by the biasing member which is common to the drain on-off valve and the flap.

4. The fuel fill opening structure of a capless type as claimed in claim 3,
   wherein the biasing member integrally comprises: a flap fixing portion which is fixed to the flap; an on-off valve fixing portion which is fixed to the drain on-off valve; and a coupling portion which couples the flap fixing portion and the on-off valve fixing portion with each other, and is arranged to be rotatable with respect to the fuel fill opening main body, and
   wherein an angle of the on-off valve fixing portion with respect to an insertion direction of the fuel gun is set to be smaller than an angle of the flap fixing portion with respect to the insertion direction of the fuel gun.

* * * * *